Figure 1:
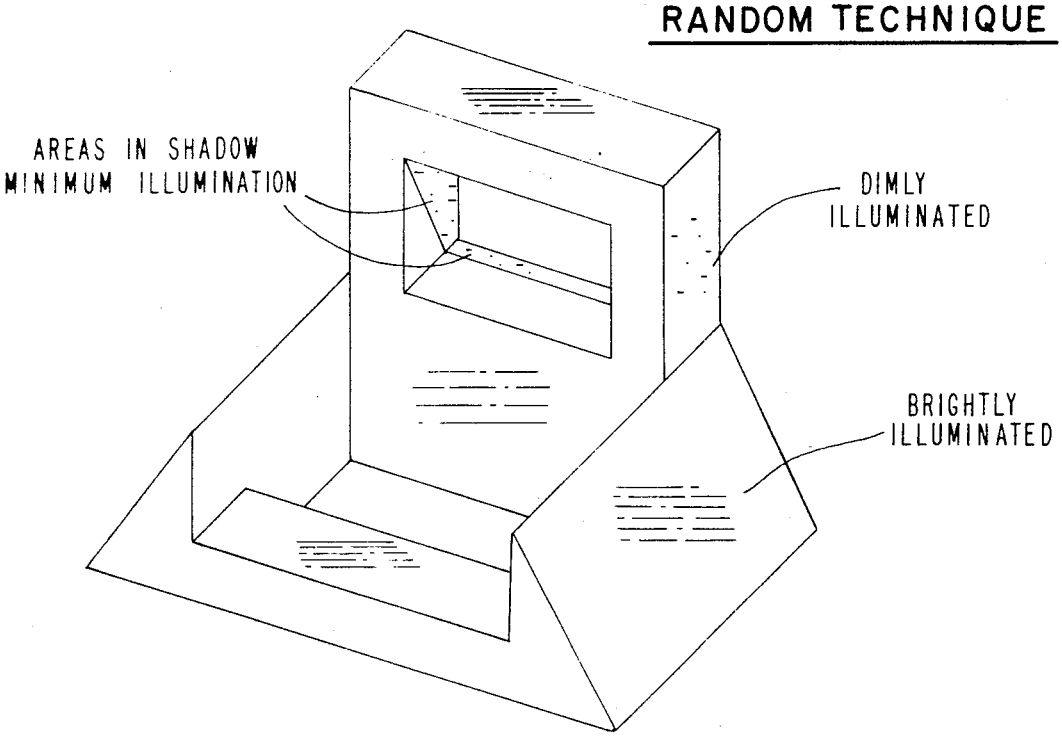
Figure 2:
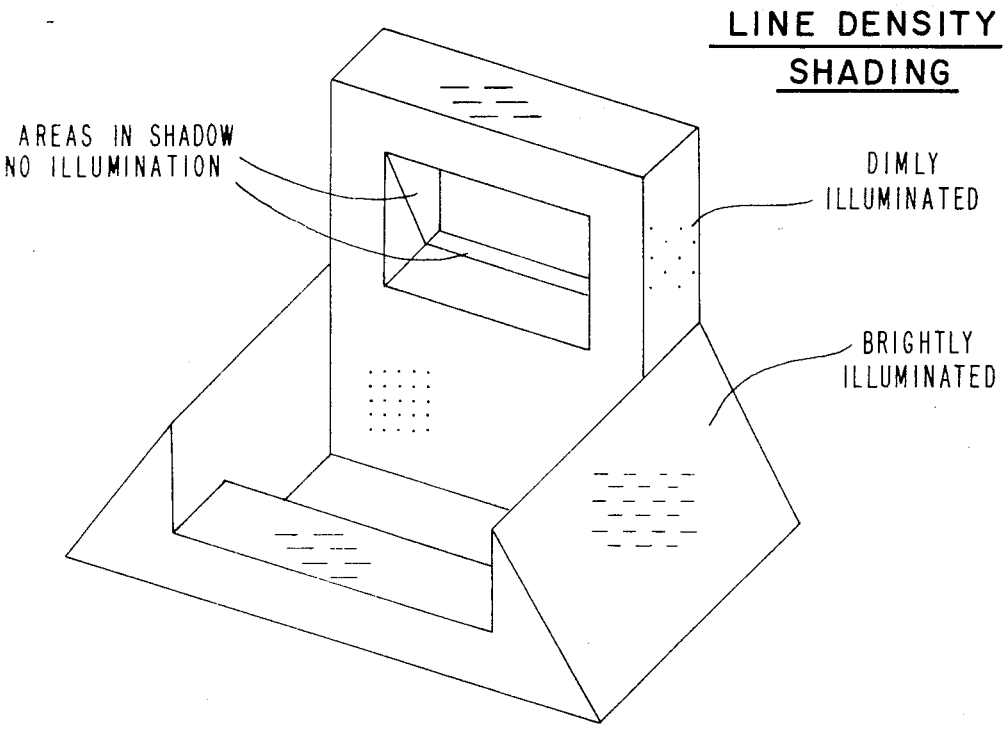
Figure 3:
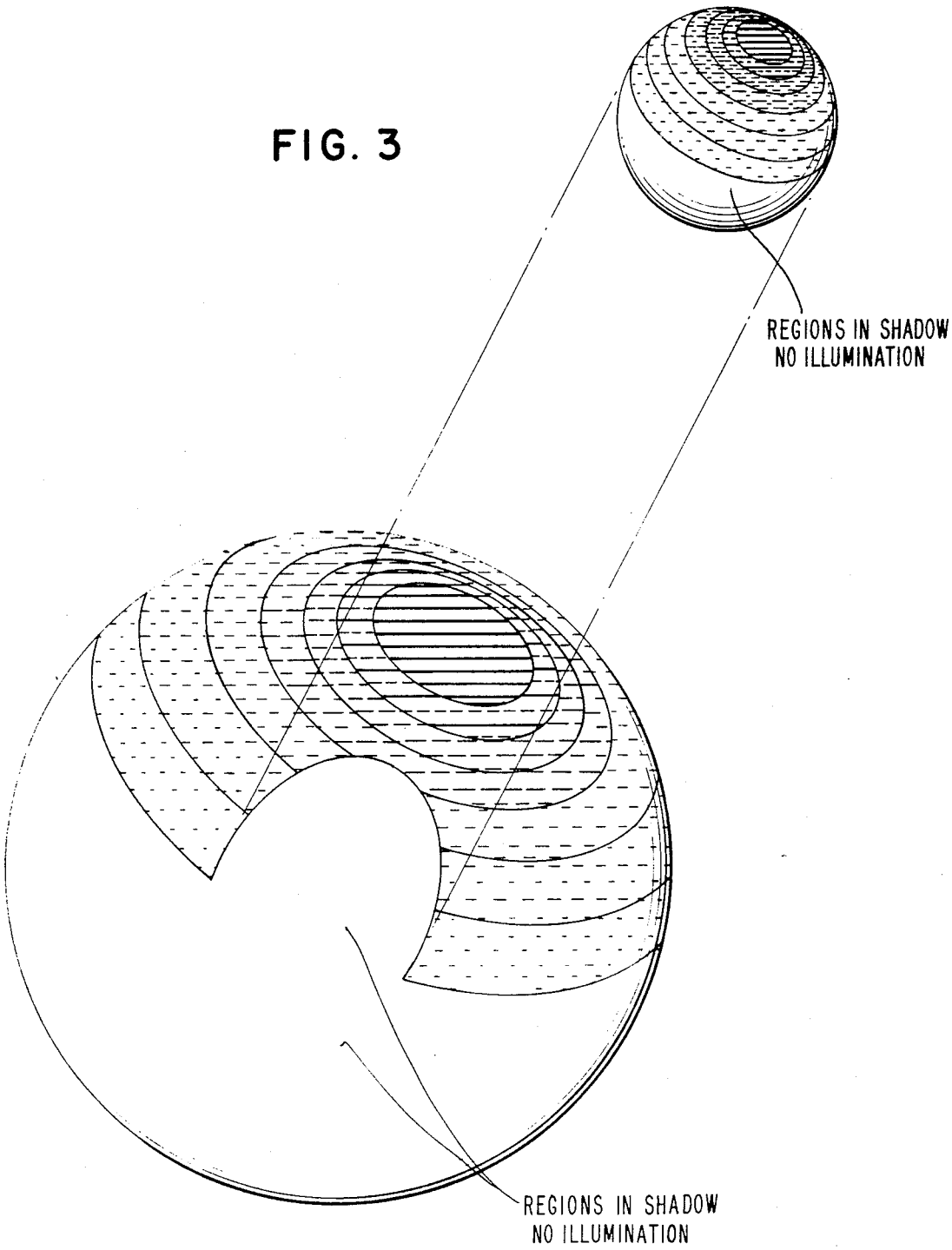
Figures 4, 4A:
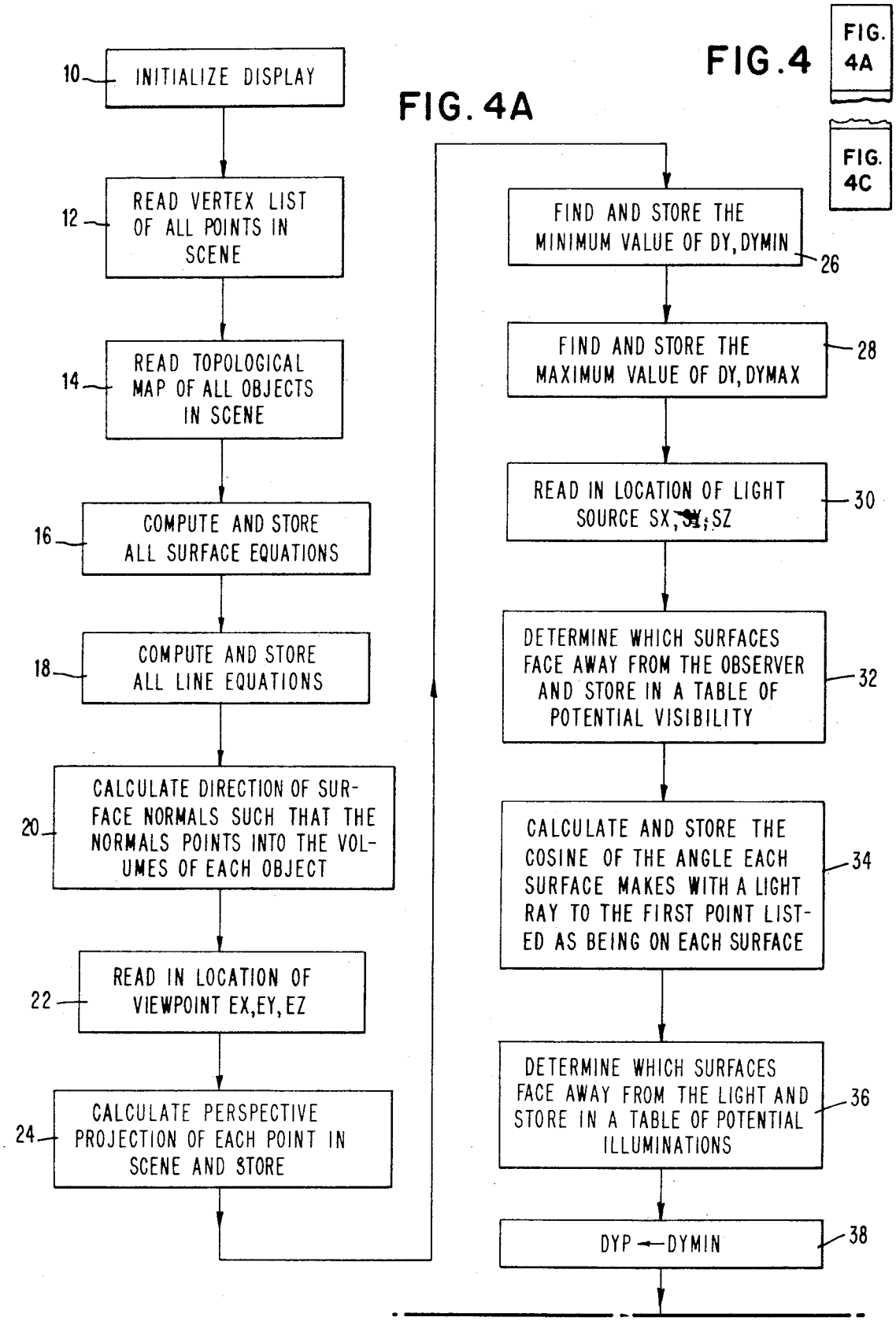
Figure 4B:
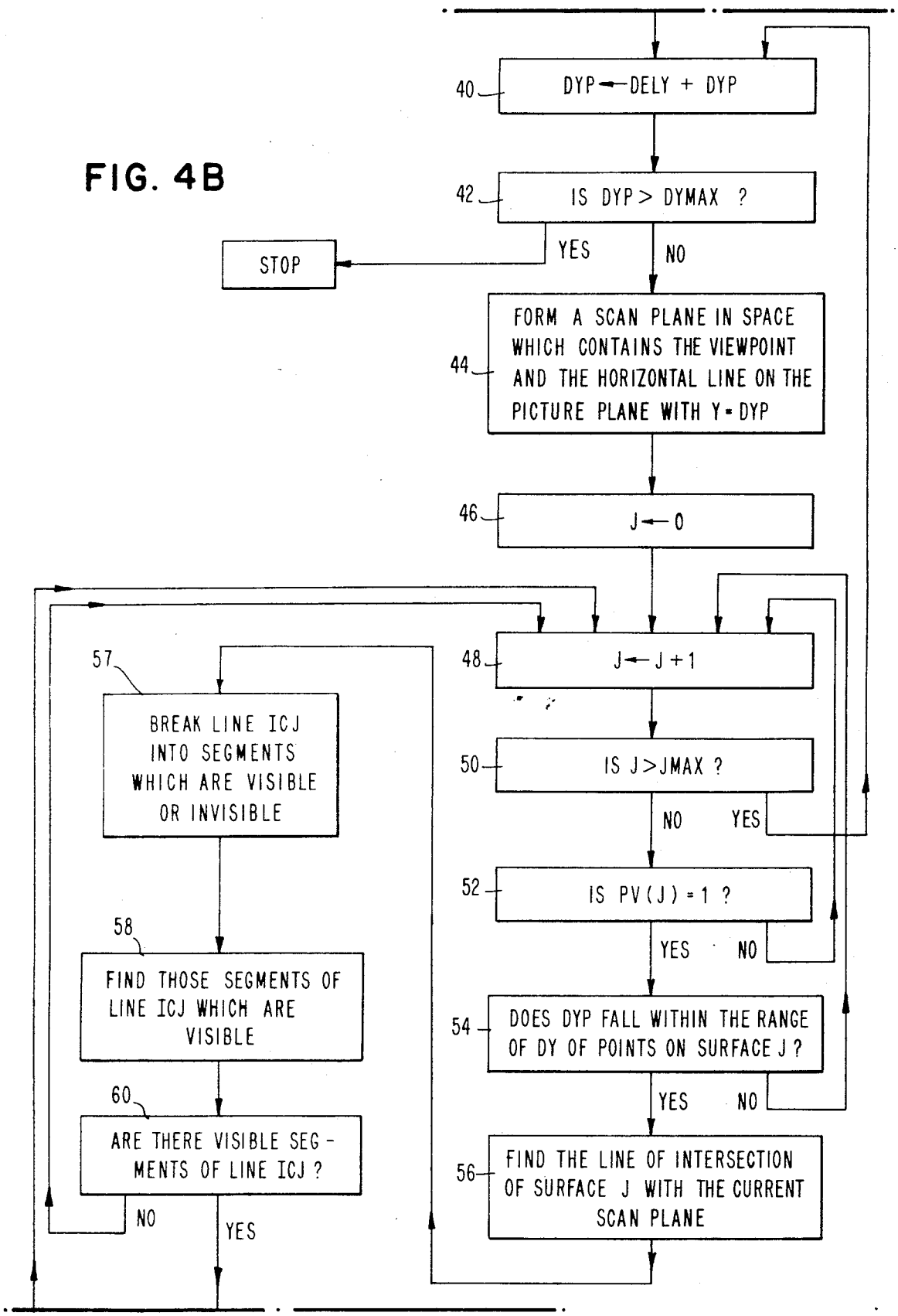
Figure 4C:
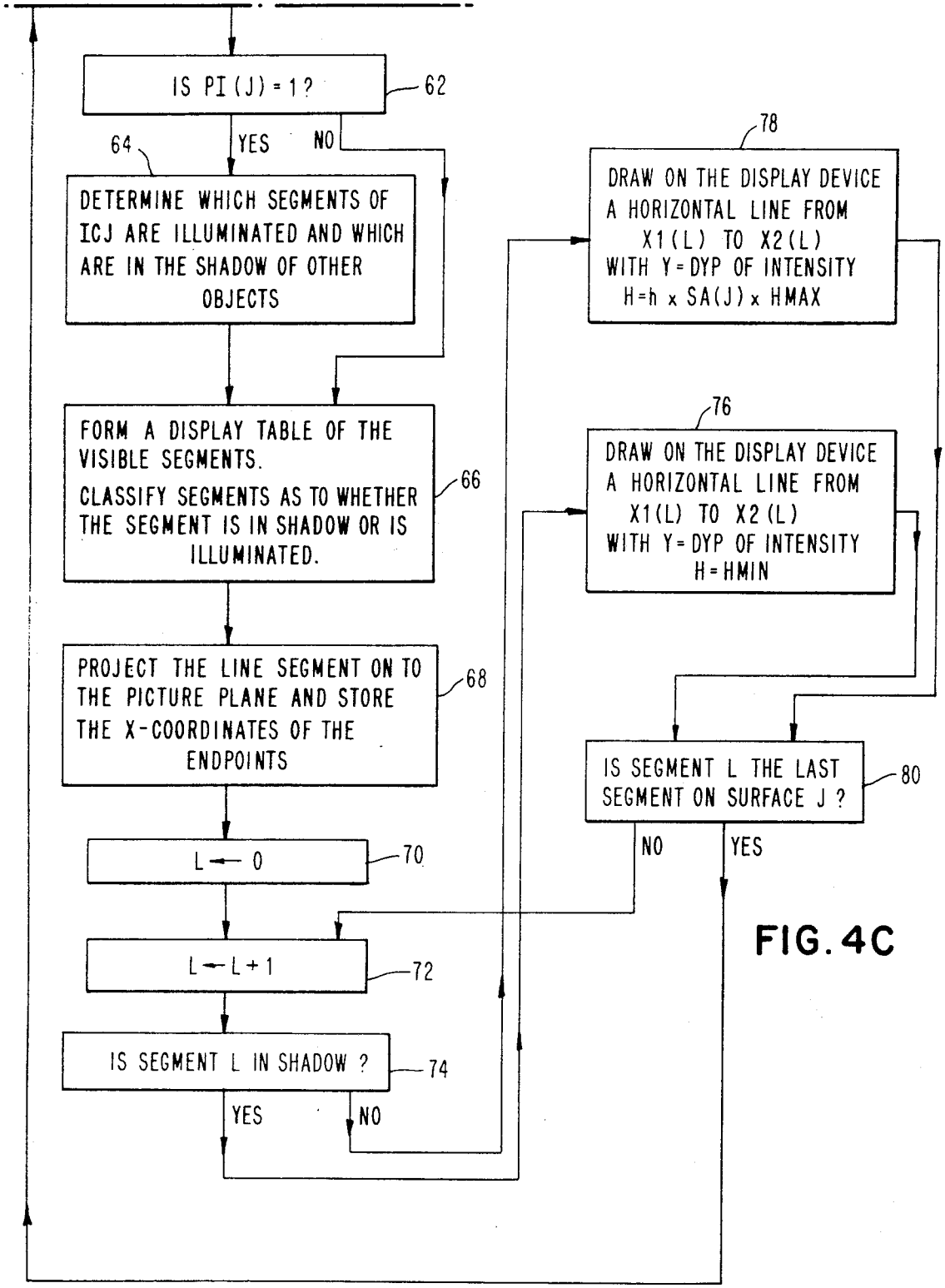
Figure 5:
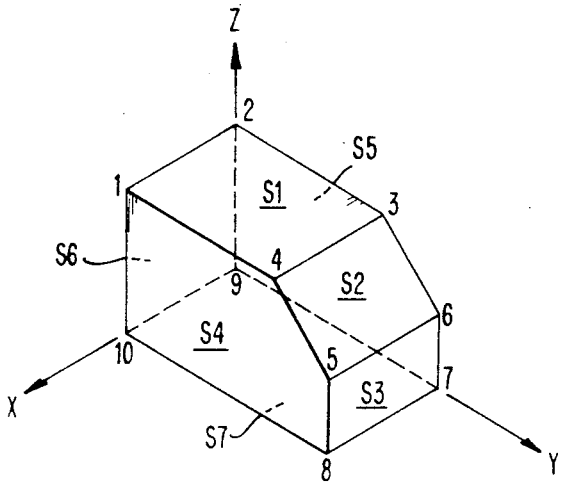
Figure 6:
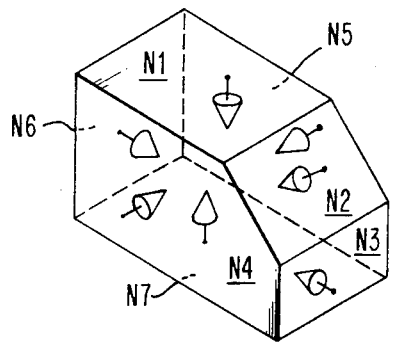
Figure 7:
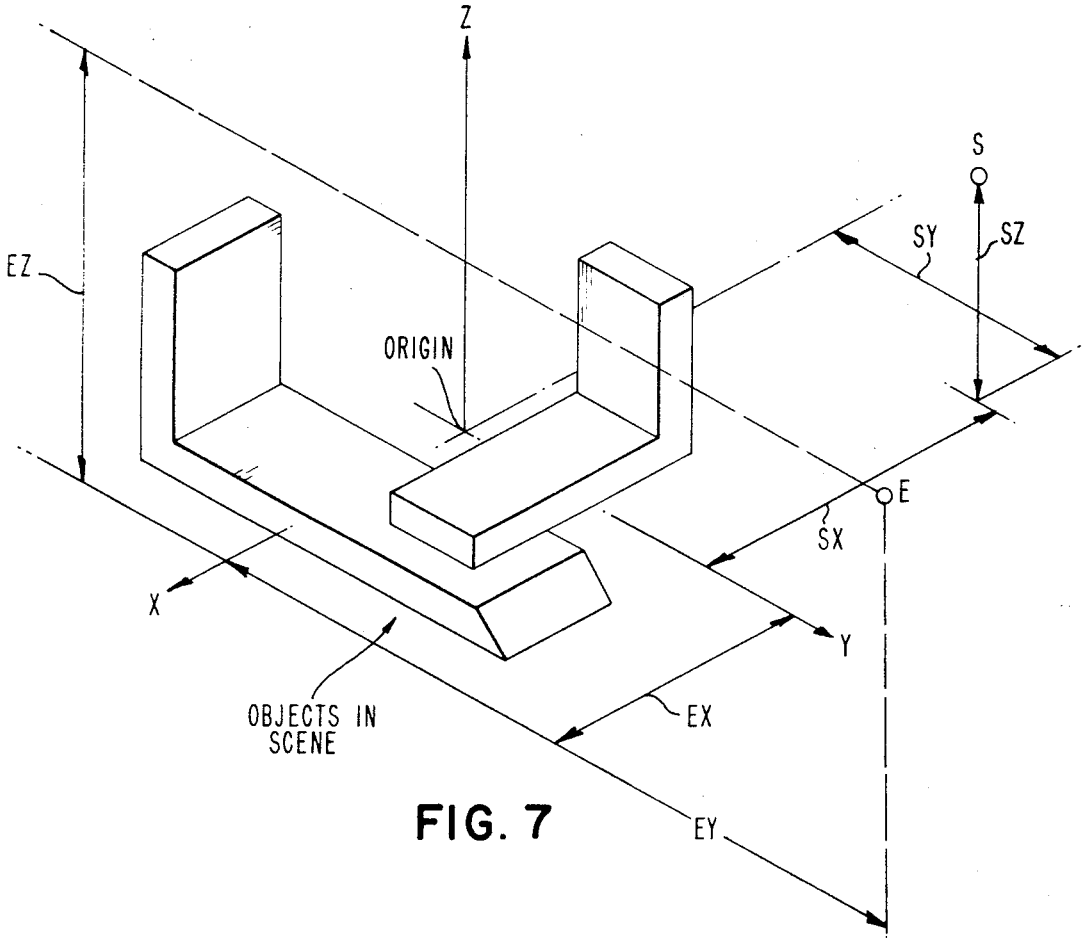
Figure 8:
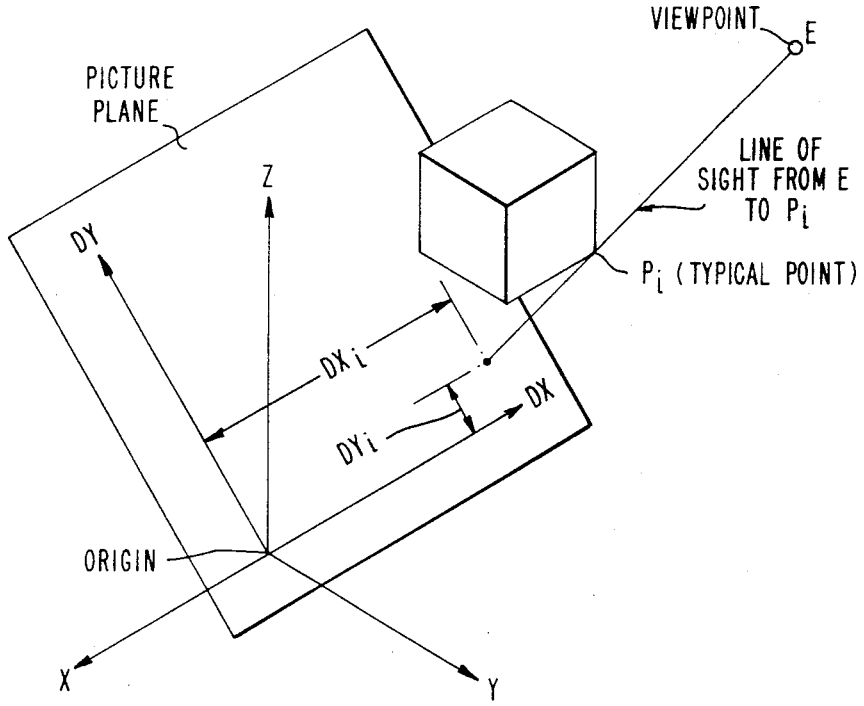
Figure 9:
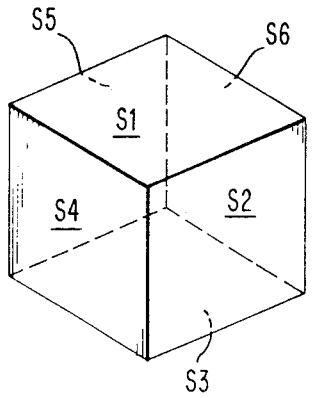
Figure 10A:
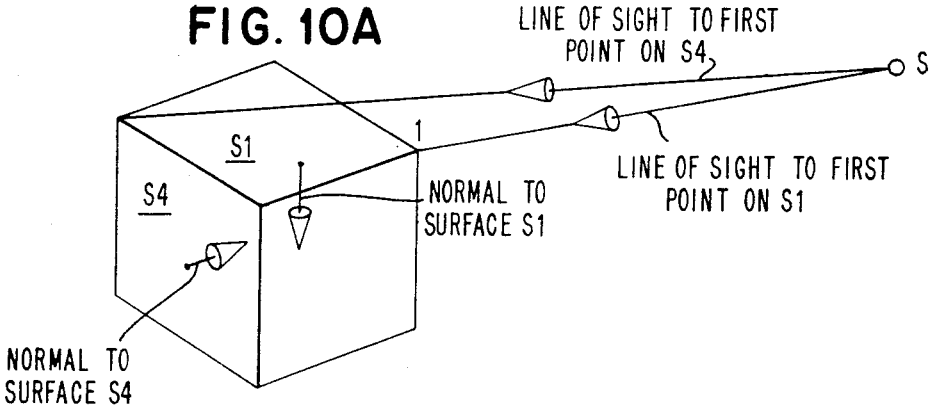
Figure 10B:
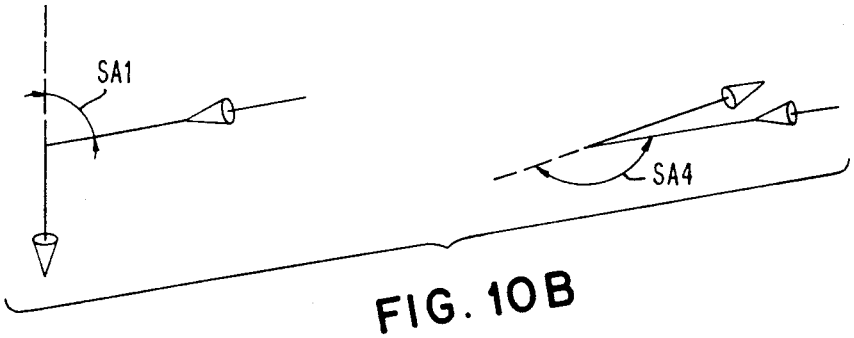
Figure 10C:
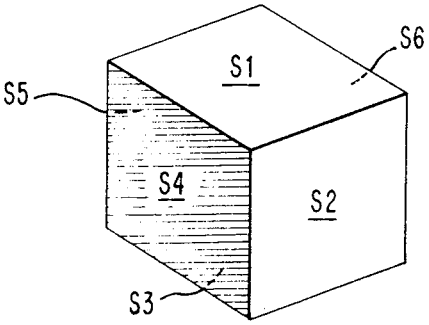
Figure 11:
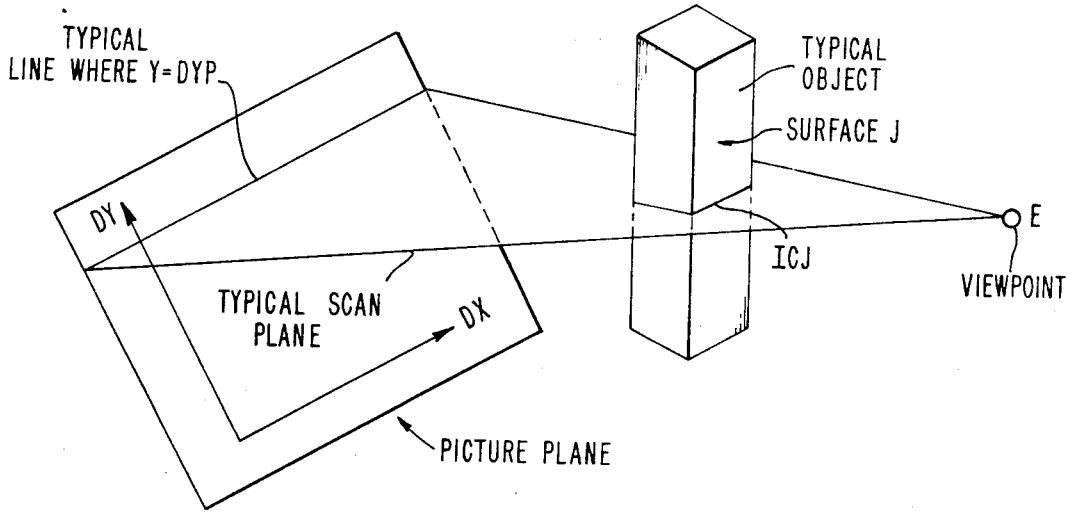
Figure 12:
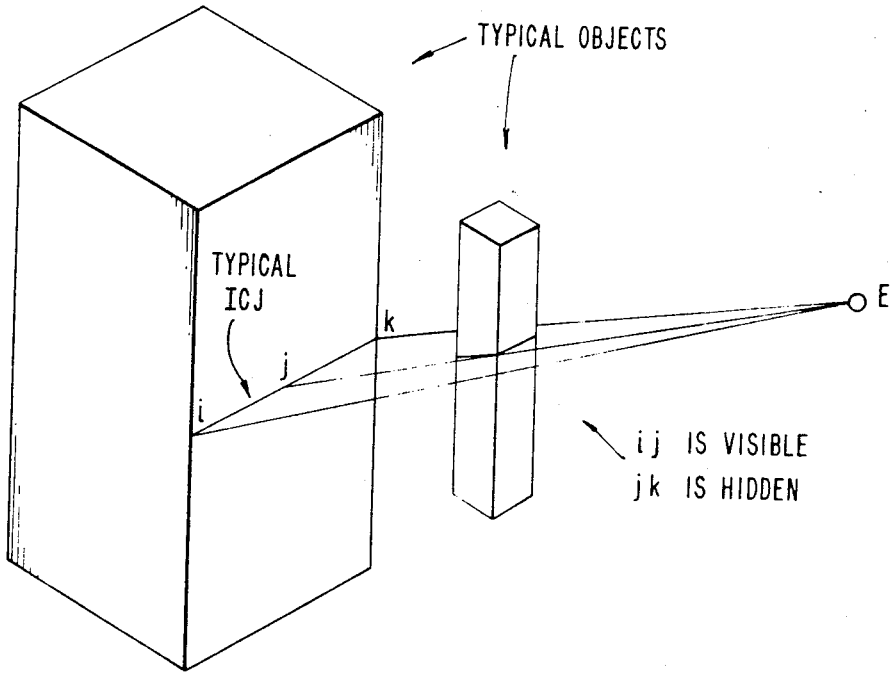
Figure 13:
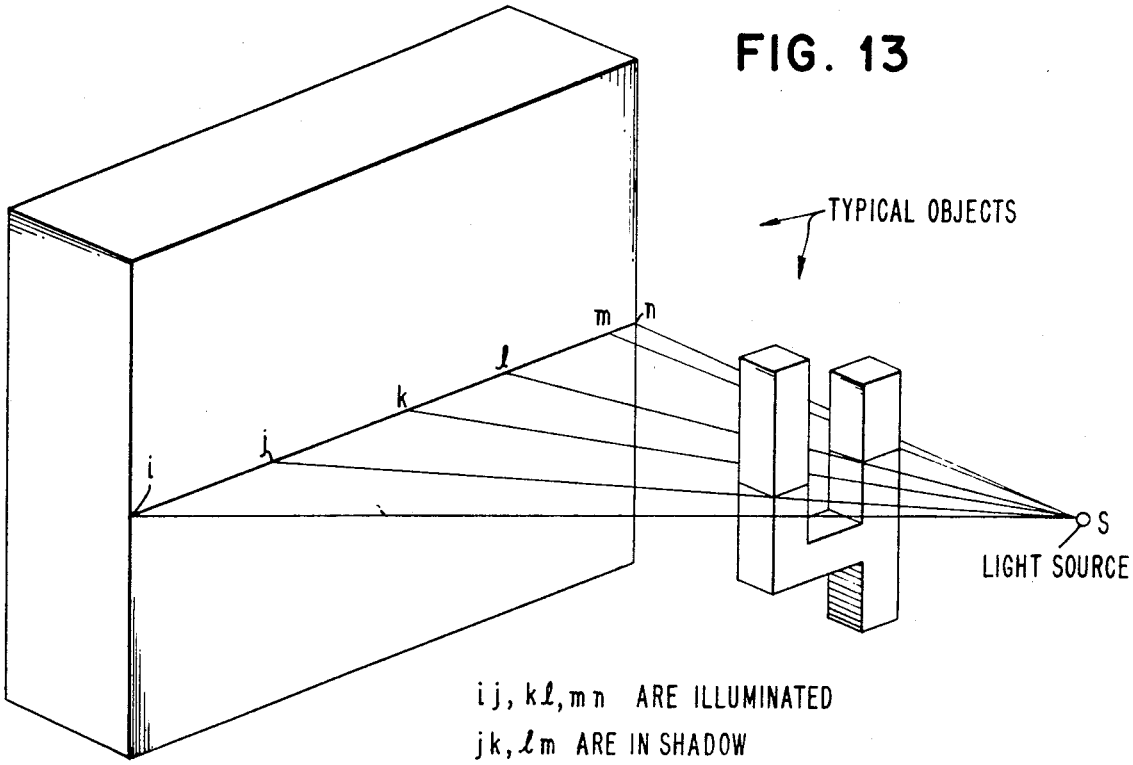
Figure 14:
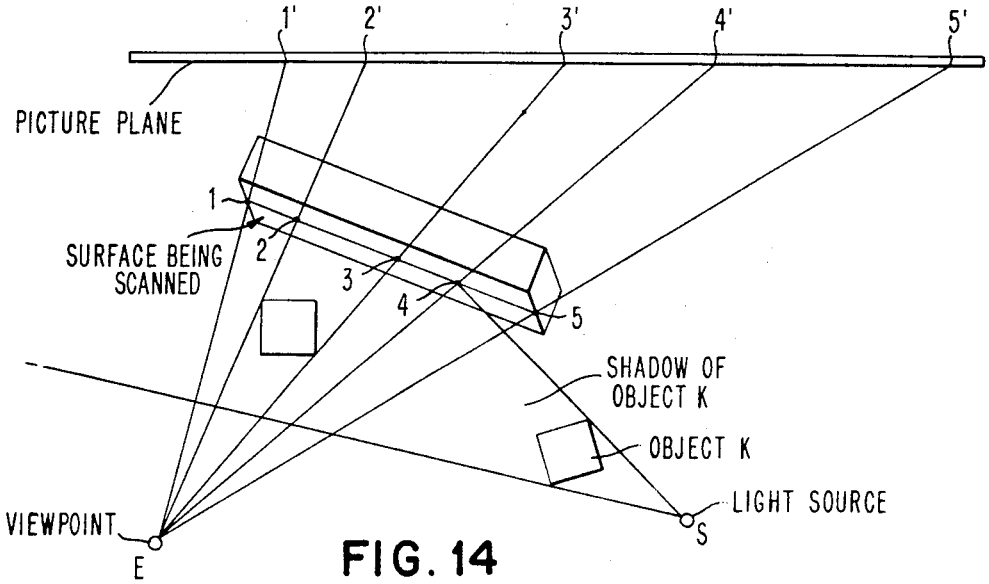
Figure 15:
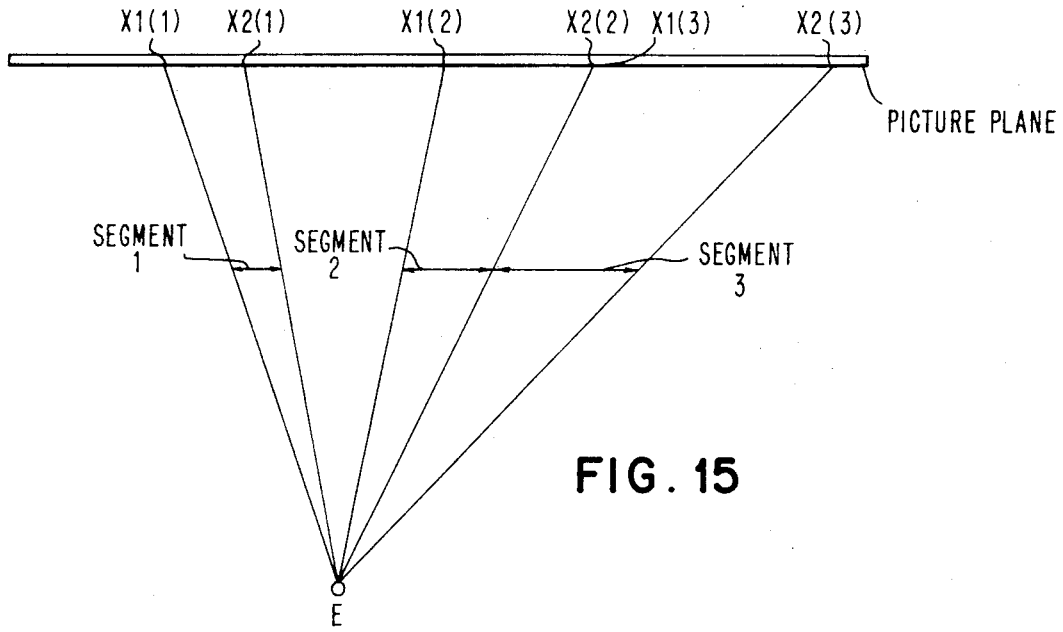
Figure 22:
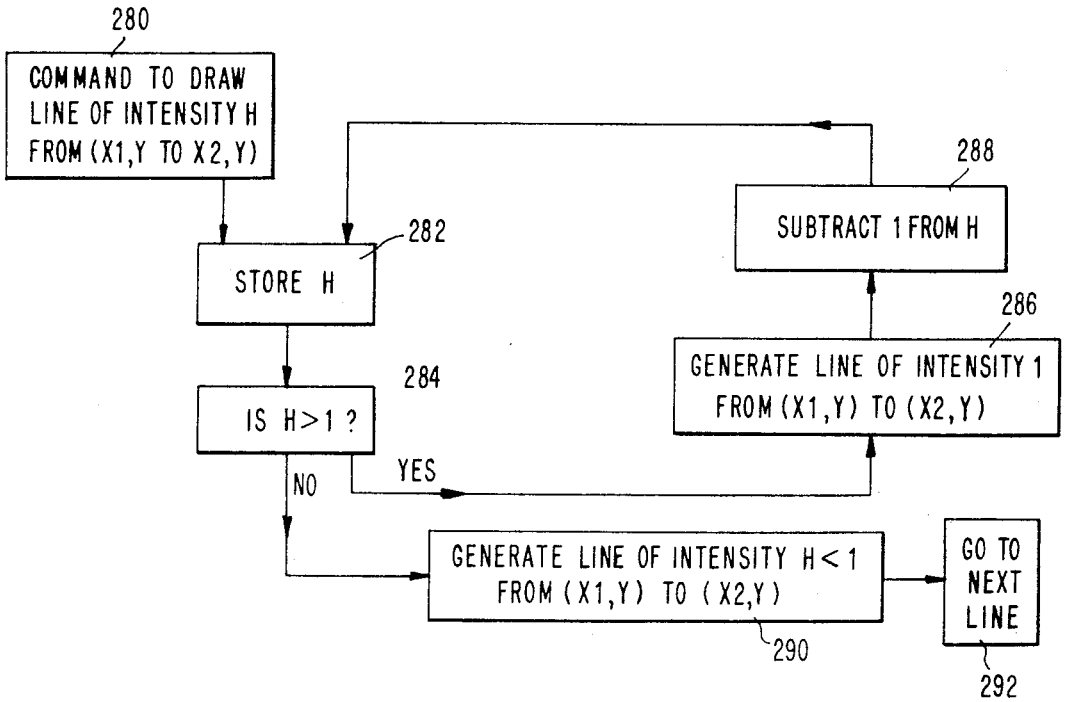
Figures 16, 16A:
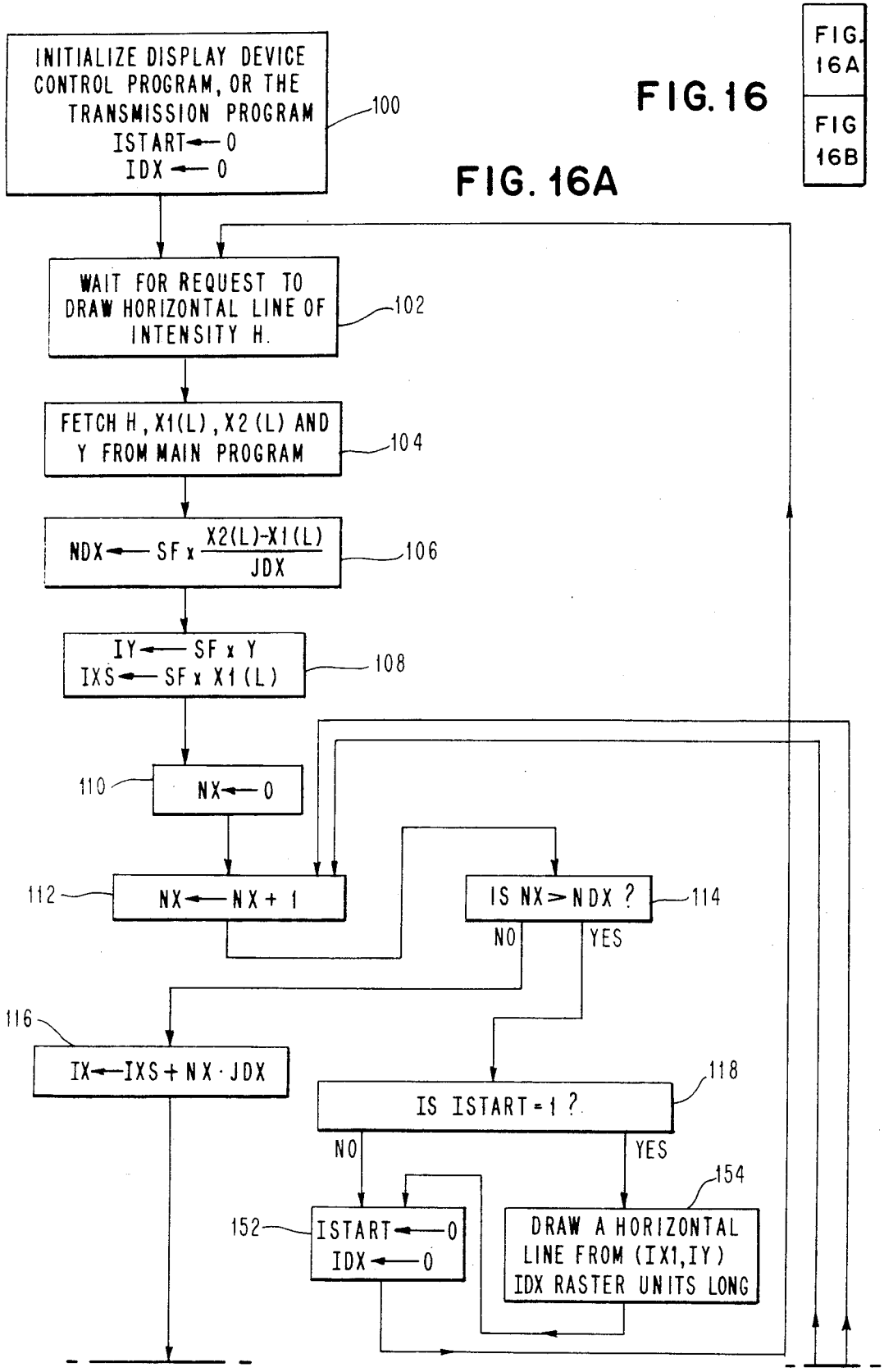
Figure 16B:
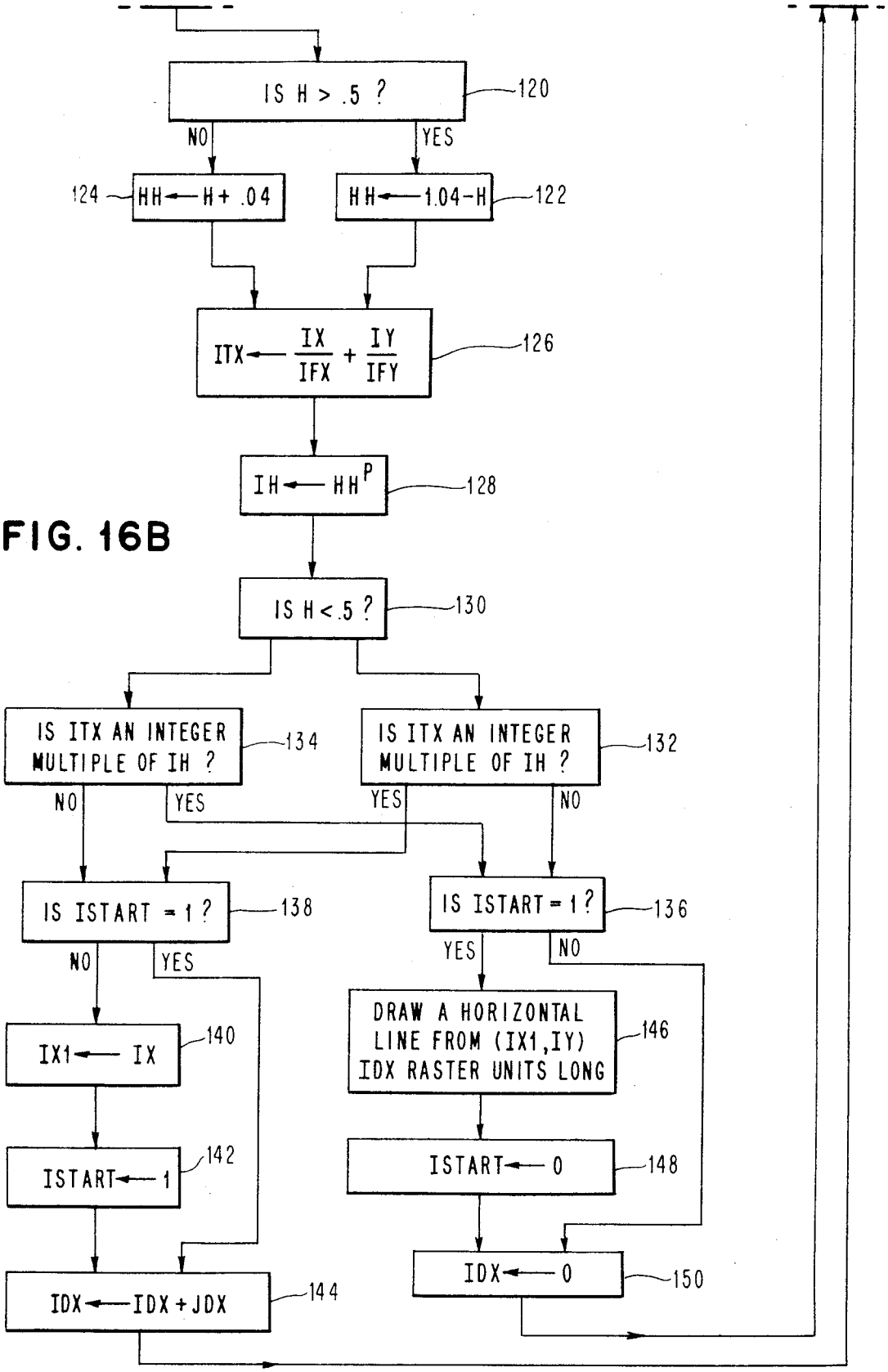
Figure 17A:
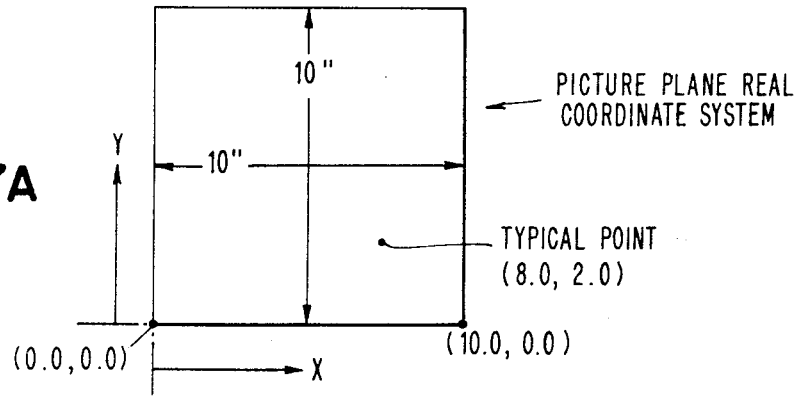
Figure 17B:
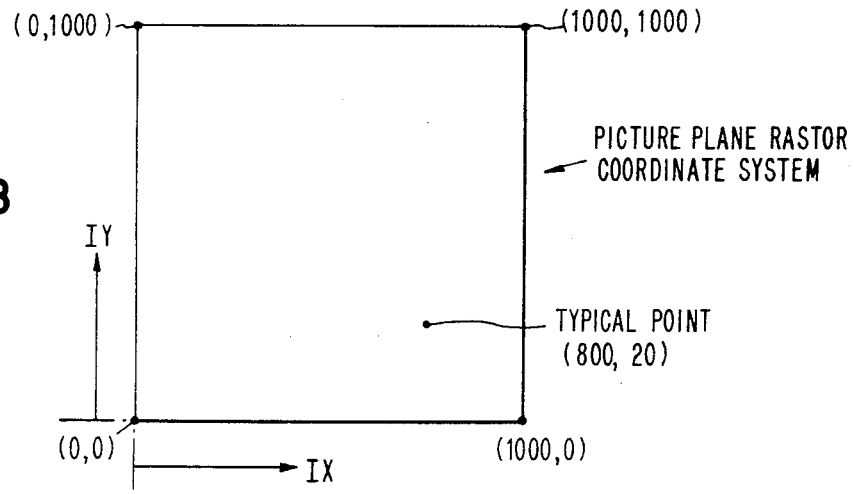
Figure 19:
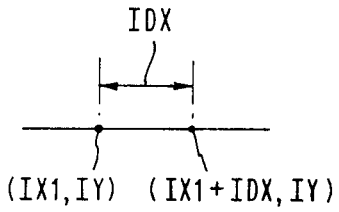
Figure 20:
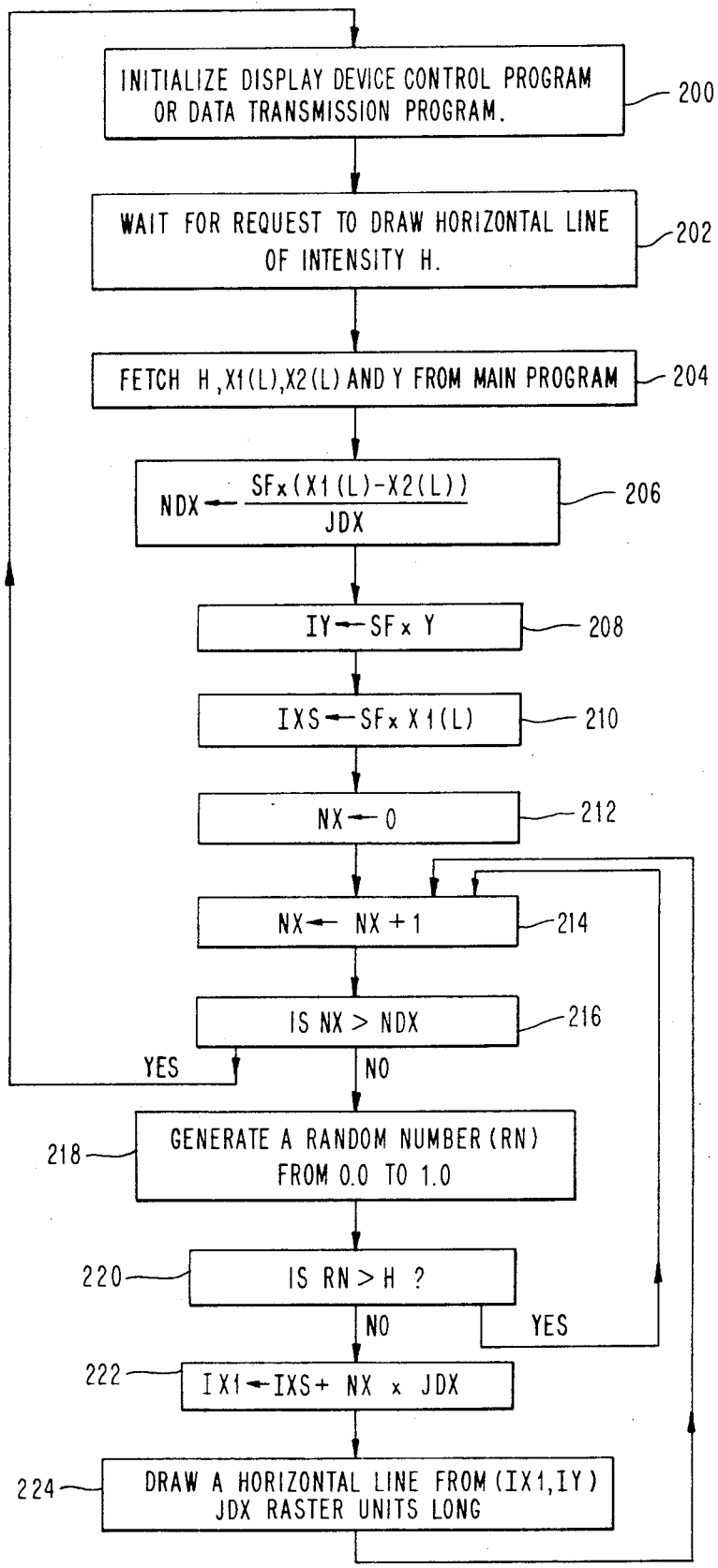
Figure 21:
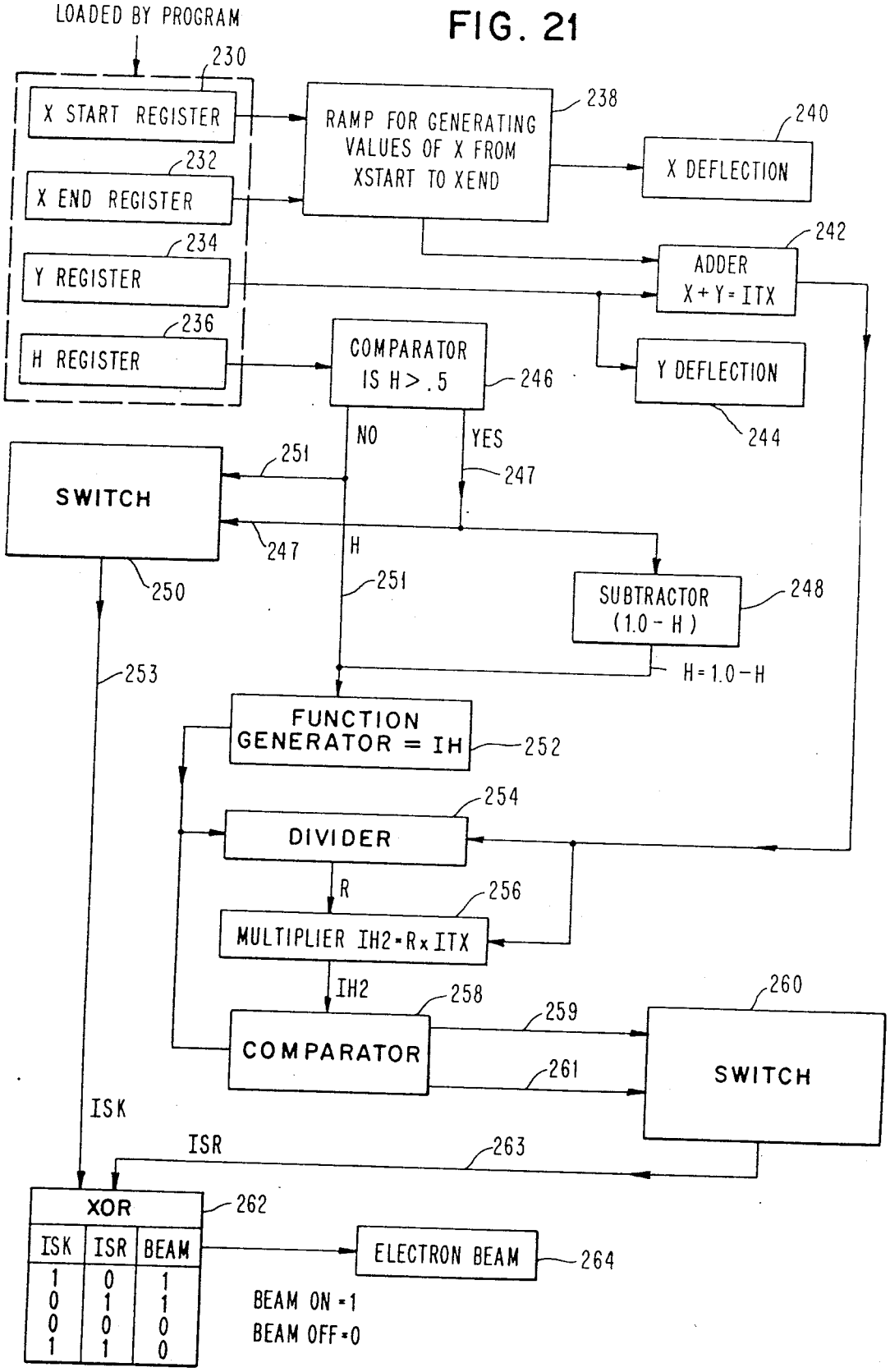

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JULY 24, 1973

912 O.G. 1232

T912,012

METHOD AND SYSTEM FOR GENERATING SHADED PICTURES

Arthur Appel and Joseph E. Harry, Yorktown Heights, and Arthur J. Stein, Peekskill, N.Y., assignors to International Business Machines Corporation, Armonk, N.Y.

Filed June 30, 1972, Ser. No. 267,801

Int. Cl. G06k *15/20;* G06f *3/14*

U.S. Cl. 444—1

16 Sheets Drawing. 42 Pages Specification

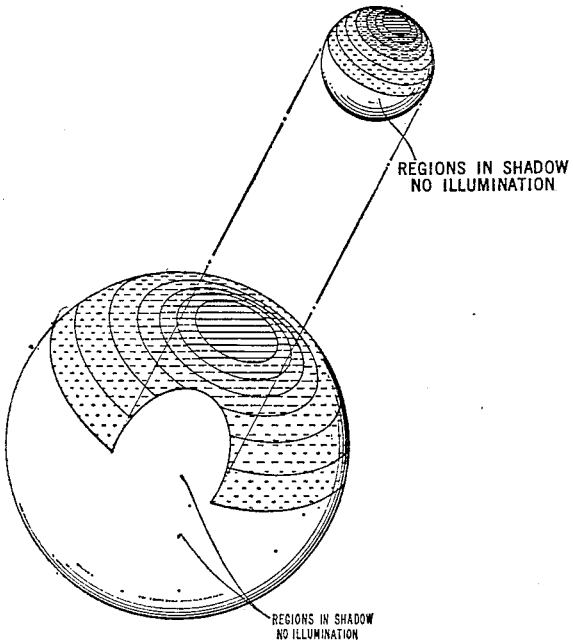

A method for use in a computer for generating shaded renderings of a scene which comprises the treating of each surface in the scene as a plurality of horizontal scan lines and the treating of each scan line on a surface as a plurality of segments. In a first embodiment of the method, there are provided specific values for illumination intensity for each surface and random number values, the minimum random number value being less than or equal to lowest value illumination intensity value for any of the surfaces. As a segment of a line is considered, the illumination intensity of the surface it falls on is compared with the random number concurrently being generated. If the random number is less than illumination intensity, then the line segment is drawn, i.e., illuminated. However, if the random number concurrently exceeds the generated segment's illumination intensity, then the segment is not drawn, i.e., not illuminated. In a second embodiment, each segment is provided with a value which is the sum of its orthographic or perspective projection coordinates, X and Y. If the illumination intensity of the surface on which the segment being considered currently lies falls within a chosen range of coordinate sums and if the sums of the X and Y coordinates of the segment is an integer multiple of a function of the illumination intensity of the segment, then the segment is drawn.

METHOD AND SYSTEM FOR GENERATING SHADED PICTURES

Filed June 30, 1972 16 Sheets-Sheet 1

RANDOM TECHNIQUE

LINE DENSITY SHADING

METHOD AND SYSTEM FOR GENERATING SHADED PICTURES

Filed June 30, 1972 16 Sheets-Sheet 2

METHOD AND SYSTEM FOR GENERATING SHADED PICTURES

Filed June 30, 1972 16 Sheets-Sheet 3

METHOD AND SYSTEM FOR GENERATING SHADED PICTURES

Filed June 30, 1972 16 Sheets-Sheet 4

METHOD AND SYSTEM FOR GENERATING SHADED PICTURES

Filed June 30, 1972 16 Sheets-Sheet 5

METHOD AND SYSTEM FOR GENERATING SHADED PICTURES

Filed June 30, 1972 16 Sheets-Sheet 6

METHOD AND SYSTEM FOR GENERATING SHADED PICTURES

Filed June 30, 1972 16 Sheets-Sheet 7

METHOD AND SYSTEM FOR GENERATING SHADED PICTURES

Filed June 30, 1972 16 Sheets-Sheet 10

METHOD AND SYSTEM FOR GENERATING SHADED PICTURES

Filed June 30, 1972 16 Sheets-Sheet 11

METHOD AND SYSTEM FOR GENERATING SHADED PICTURES

Filed June 30, 1972 16 Sheets-Sheet 12

FIG. 18A — — — — H > .5

FIG. 18B - - - - H < .5

METHOD AND SYSTEM FOR GENERATING SHADED PICTURES

Filed June 30, 1972 16 Sheets-Sheet 16